United States Patent [19]

Murray et al.

[11] Patent Number: 4,477,914
[45] Date of Patent: Oct. 16, 1984

[54] ADAPTIVE EQUALIZER

[75] Inventors: James A. Murray, Sawbridgeworth; David Nyman, New Barnet, both of England

[73] Assignee: International Standard Electric Corporation, New York, N.Y.

[21] Appl. No.: 344,835

[22] Filed: Feb. 1, 1982

[30] Foreign Application Priority Data

Feb. 10, 1981 [GB] United Kingdom ................. 8104087

[51] Int. Cl.³ .............................................. H04B 3/14
[52] U.S. Cl. ....................................... 375/14; 333/18; 375/17
[58] Field of Search ........................ 375/11, 12, 14, 17, 375/102; 455/303, 304, 305; 328/162; 333/18

[56] References Cited

U.S. PATENT DOCUMENTS 3,378,847  4/1968  Grover et al. ....................... 375/102
3,502,986  3/1970  Lucky .................................. 375/17
3,870,996  3/1975  Miller ................................ 375/102

Primary Examiner—Benedict V. Safourek
Attorney, Agent, or Firm—John T. O'Halloran; Thomas F. Meagher

[57] ABSTRACT

In a digital system, especially where PCM coded speech is conveyed over twisted pair cables optimized for analogue speech, a pulse is received distorted, the distortion being especially bad on the trailing edge of the pulse. This decays slowly enough to cause intersymbol interference with the next pulse.

This is overcome by applying the signal from an amplifier (11), FIG. 4, to one input of a subtractor (12) via a delay and attenuation circuit (13-15) and to the other input of the subtractor directly. The delay (13) is such as to optimize the peak of the received pulse, and the attentuation level is calculated to cancel out the tail of the received pulse so that it is zero at the center of the sampling point of the next bit.

4 Claims, 10 Drawing Figures

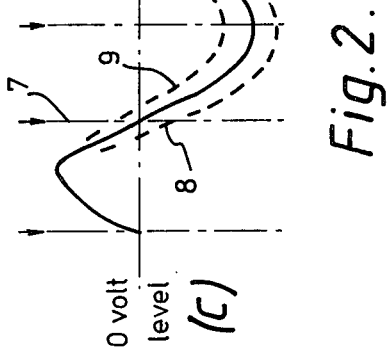
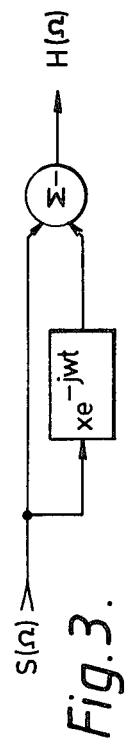
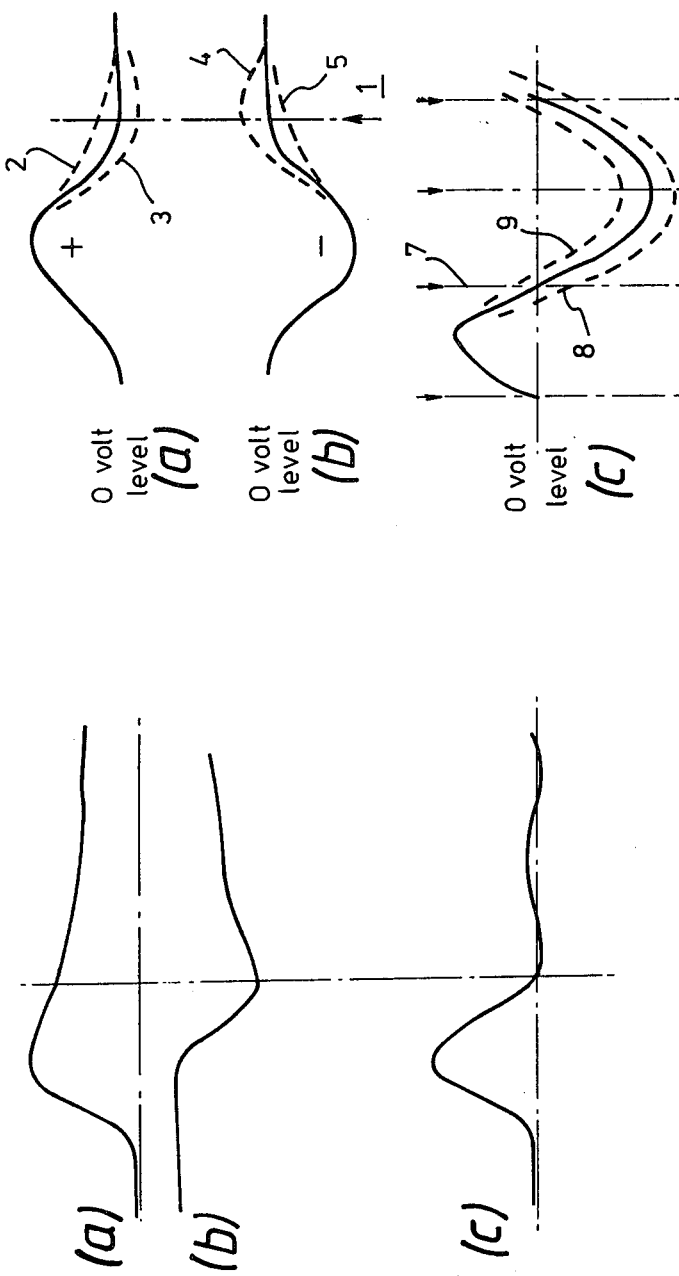
Fig. 1.
Fig. 2.
Fig. 3.

(a)

(b)

ADAPTIVE EQUALIZER

BACKGROUND OF THE INVENTION

1. Field of the Invention

This invention relates to an adaptive equalizer for use in a digital line transmission system.

2. Background

Pulse transmission down telephone twisted pair cable is needed when speech is PCM encoded. For A-law PCM the basic information rate is 64K bits/sec; in digital local area telephony the need for additional bits for synchronization and signalling increases this to 80K bits/sec. For duplex operation on one pair of wires, a two to four wire hybrid technique can be used, in which case the line transmission rate remains at 80K bits/sec, or time separation can be used. In this case one or more PCM frames is assembled into one burst and sent out at a higher rate, usually of the order of three times the normal bit rate, with the wires conveying the bursts alternately in different direction.

Since the relatively high bit rates have to be transmitted over twisted pair cables optimized for audio band transmission, the pulses would be considerably attenuated and distorted at the end of the line. The waveform shown in FIG. 1a is an example showing the distortion to a 2 μsec pulse after reception over 4 Km of 0.5 mm transmission cable. The waveform is amplified and shows that the leading edge is fairly "well behaved", but the trailing edge has a very slow decay, which can cause inter-symbol interference. For a continuous mode of transmission, where pulses of either polarity, or zero, may be transmitted consecutively, it is desirable to constrain the period of the pulses to within two periods, i.e. to be zero at the centre of the adjacent pulses and at a maximum at its centre.

SUMMARY OF THE INVENTION

An object of the invention is to provide an equalizer in which the above requirements are achieved.

According to the present invention there is provided an adaptive delay equalizer for use in the reception of intelligence conveyed in pulse form, in which on reception the pulses are each delayed by a preset time, and in which the delayed pulse is reduced in amplitude by a variable amount and subtracted from the original pulse, the amount of the time delay and the amount of the amplitude reduction being such that the distortion present at the trailing edge of the pulse is substantially reduced or eliminated.

A preferred embodiment of the invention will now be described with reference to the accompanying drawings, in which:

BRIEF DESCRIPTION OF THE DRAWINGS

FIGS. 1a-1c and 2a-2c are waveform diagrams useful in explaining the invention;

FIG. 3 is a simplified diagram explanatory of the principle of delay feedback equalization.

DESCRIPTION OF THE PREFERRED EMBODIMENT

Figure 4:
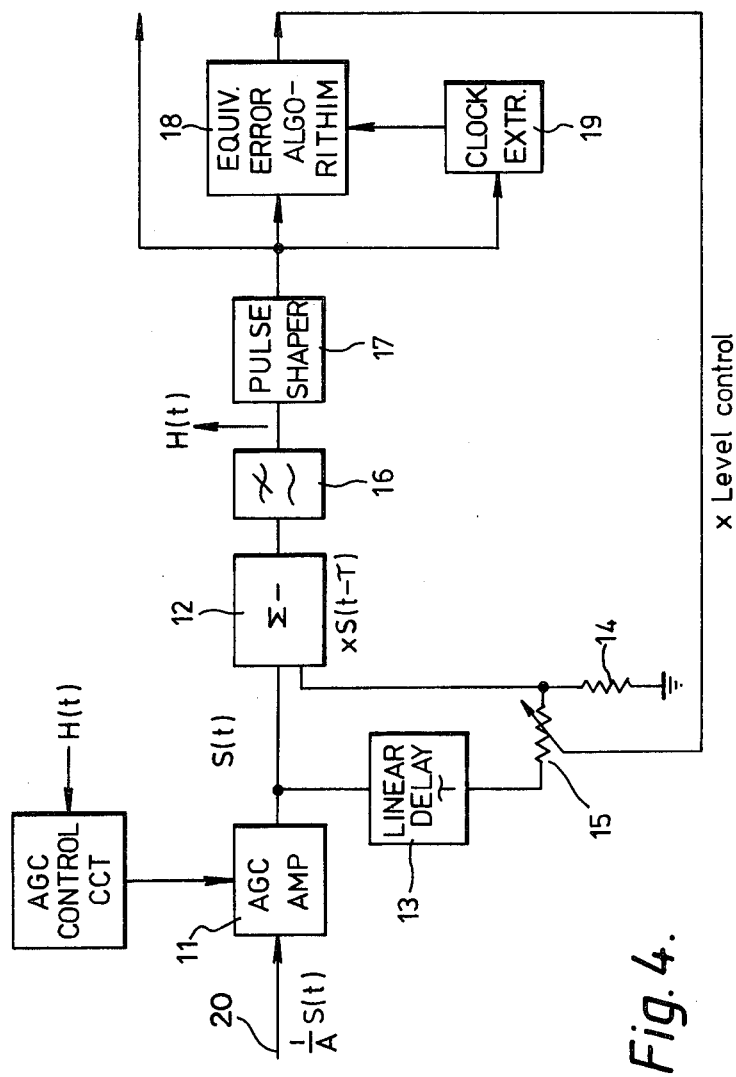
FIG. 4 is a simplified block diagram of an adaptive delay equalizer embodying the invention.

The basis of the equalizer will be clear from the waveform of FIG. 1. As already mentioned, FIG. 1a shows one example of a pulse as received with distortions due to line conditions. Note especially that the most serious distortion is the slow delay of the pulse trailing edge. To minimize or eliminate this distortion, a fraction of main signal S(t) is delayed by a period $\tau$, i.e. to give $xS(t-\tau)$, where $0 < X < 1$, and subtracted from the main signal. This fraction is shown inverted at FIG. 1b, and the result of the subtraction is shown at FIG. 1c. The period $\tau$ and the fraction $x$ are so chosen that the centre of the main pulse remains undisturbed and the point which corresponds to the centre of an adjacent pulse reaches zero.

Although the pulse duration of the transmitted signal is given as 2 μsec it is assumed that the pulse repetition rate is 4 μsec. Thus the optimum duration for $\tau$ would lie between a half and one bit period; 2 to 4 μsec in this case, dependent on the rising edge of the received pulse. Normally to optimize bandwidth we have found it desirable for the delay to be a half bit. The fraction of the delay signal required depends directly on the degree of distortion, and equals that portion of the main signal which remains 4 μsec from the peak, i.e. at the sampling point of the next pulse. The technique of pulse equalization depends on the degree of distortion and is independent of absolute amplitude.

The system whose principle is described above is made adaptive to compensate for varying degrees of distortion, i.e. line type and length, by devising an algorithm which brings to zero the residue of any given pulse at the centre of the next pulse. This is illustrated for ternary, i.e. Alternate Mark Inversion (AMI) code, transmission of the intelligence signal, S(t), of FIG. 4:

| Previous Pulse Polarity | Present Pulse Polarity | Correction |
|---|---|---|
| 0 | 0 | − |
| + | − | − |
| + | 0 | |
| − | + | − |
| − | 0 | |
| 0 | + | − |
| 0 | − | − |

Thus it will be seen that correction is only made from positive or negative pulses to zero. A simple data scrambling technique ensures that sufficient error correcting periods exist which can be averaged over a suitable time.

This correction algorithm is illustrated schematically in FIG. 2, in which FIG. 2a is for a positive pulse followed by a zero and FIG. 2b is for a negative pulse followed by a zero. Hence the line 1 corresponds to the centre of the next bit period and the full line curve is a correctly equalized pulse. The line 2 shows the state in which the pulse is under-equalized, so that x has to be increased. The line 3 represents the case in which the pulse is over-equalized, so x has to be decreased. Similarly in FIG. 2b, the line 4 shows the pulse over-equalized so x must be decreased while the line 5 shows the pulse under-equalized so x must be increased. Thus to summarize the correction algorithm, for + to + or − to − one increases x, and for + to − or − to + one decreases x.

For two-level codes such as the Miller code or the dipulse code, the correction algorithm is simpler since if there is a transition at the bit boundary 7, FIG. 2c, it will be either early as at 8 if over-equalized, or late, as at 9 if under-equalized.

Figure 5:
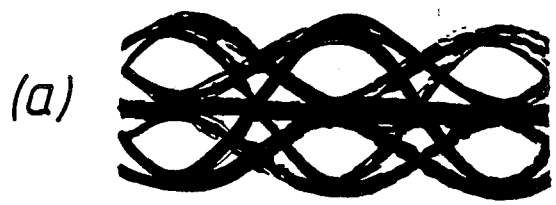
FIGS. 5a and 5b show eye diagrams in the equalizer of FIG. 4.
Figure 5:
Figure 5:
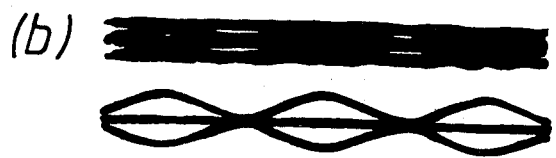

An equalizer embodying the above principles was designed for use with a scrambled AMI code at a bit rate of 256K bits/sec, and gave a good performance over a line length of 8 km with 0.5 mm copper distribution cable-see also the eye diagrams, FIG. 5.

The principle of delay feedback equalization is illustrated schematically in FIG. 3, as defined by the following equasion:

$$H(\Omega)=S(\Omega)\{1-xe^{-j\omega\tau}\}, \text{ where } 0<x<1.$$

We now turn to the simplified block diagram of FIG. 4 to give a more detailed description of an equalizer based on the above principles.

In the block diagram of FIG. 4, the incoming signal is defined as (1/A)S(t), the (1/A) indicating that the intelligence signal, S(t), which may be a PCM encoded telephone information of digital data signal, has been attenuated during its traversal of the digital transmission line 20, which may be a twisted pair cable. This signal is applied to an AGC amplifier 11, which amplifies the incoming signal yielding the intelligence signal S(t); the AGC feature ensures that the output of this amplifier has a substantially constant amplitude. The signal S(t) is applied directly to one input of a subtraction circuit 12, and indirectly thereto via a linear delay circuit 13 which introduces the constant delay $\tau$. The connection from the delay circuit 13 to the other input of the subtraction circuit 12 is via an attenuator represented by a fixed resistor 14 and an adjustable resistor 15.

The output of the subtraction circuit 12 passes via a low pass filter 16 whose output forms the output of the equalizer, to a pulse shaper 17 to produce logic compatible signals. This output is applied to an equalization error algorithm circuit 18 and to the clock extraction circuit 19. The latter circuit controls the circuit 18, whose output is indicative of the error condition of the received signal, and is used to adjust the attenuator, as shown by the connection to the variable resistor 15. Thus the value of x is varied in the manner referred to above.

By the technique described above it would also be possible to cancel out forward delay echoes due to bridged tap discontinuities along the transmission line. This would need at least one more tap delayed by 2 $\tau$ and a separate x control. The error algorithm would then need correction for two consecutive zeroes, making use of an iterative approach.

We now refer briefly to FIGS. 5a and b which are derived from photographs of eye diagrams for the delay feedback equalizer operating at 8 Km with 0.5 mm distribution cable. Data is sent in the basic mode at 256k bit/s, using scrambled AMI code. FIG. 5a shows the eye at the receiver after automatic gain control and equalization. FIG. 5b in the upper row shows the received eye after equalization, in the middle row the received signal before equalization, and in the bottom row the transmit signal.

What is claimed is:

1. An adaptive delay equalizer for use in the reception of intelligence conveyed as pulses in pulse-modulation form comprising:
    means for receiving said pulses, means for delaying each of said pulses; means for equalizing said pulses by reducing the delayed pulse in amplitude by a variable amount and subtracting the reduced delayed pulse from the unreduced undelayed pulse, so that the amount of the time delay and the amount of the amplitude reduction is such that any distortion present at the trailing edge of the pulse is substantially reduced or eliminated.

2. An equalizer as claimed in claim 1, wherein the intelligence is conveyed in a ternary code form so that the possible line conditions comprise positive pulse, a zero state and a negative pulse, further comprising extracting means for extracting correction information when a positive pulse is followed by a zero state or a negative pulse is followed by a zero state.

3. An adaptive delay equalizer for use in the reception of intelligence conveyed as pulses in pulse-modulation form, wherein said intelligence could be PCM encoded telephone information or digital data transmitted over a digital transmission line such that said pulses are attenuated and distorted in the course of transmission, comprising:
    means for receiving said pulses, means for delaying each of said pulses; and means for equalizing said pulses by reducing the delayed pulse in amplitude by a variable amount and subtracting the reduced delayed pulse from the unreduced undelayed pulse, so that the amount of the time delay and the amount of the amplitude reduction is such that any distortion present at the trailing edge of the pulse is substantially reduced or eliminated to effect reduction of intersymbol interference.

4. An adaptive equalizer as claimed in claim 3 wherein said digital transmission line comprises a twisted pair cable.

* * * * *